United States Patent [19]
Geagan

[11] 3,904,121
[45] Sept. 9, 1975

[54] WATER DISTRIBUTOR FOR DOWNSPOUTS

[76] Inventor: Edward R. Geagan, 895 Barton Ave., Rockledge, Fla. 32955

[22] Filed: Nov. 20, 1973

[21] Appl. No.: 417,609

[52] U.S. Cl. .................... 239/208; 61/15; 138/94; 138/103; 239/282; 239/547; 239/551
[51] Int. Cl.² .......................................... B05B 1/14
[58] Field of Search ............... 52/12, 16; 61/14, 15; 210/435, 454; 239/542, 546, 547, 208, 282, 239/551; 138/37, 40, 41, 89, 94, 103, 118, 177, 178

[56] References Cited
UNITED STATES PATENTS

| | | | |
|---|---|---|---|
| 2,747,935 | 5/1956 | Szantay | 138/103 X |
| 2,800,925 | 7/1957 | Tollefsen | 61/15 X |
| 2,814,529 | 11/1957 | Arnt | 239/546 |
| 2,975,805 | 3/1961 | Horu | 239/282 X |
| 3,021,102 | 2/1962 | Kuempel | 61/15 X |
| 3,035,779 | 5/1962 | Convis | 239/547 X |
| 3,429,125 | 2/1969 | Shotton | 239/542 X |
| 3,508,586 | 4/1970 | Gimler | 138/89 |
| 3,603,511 | 9/1971 | La Pierre et al. | 239/547 X |

OTHER PUBLICATIONS

Popular Mechanics; Aug. 1959, p. 83.

Primary Examiner—John W. Huckert
Assistant Examiner—Charles Gorenstein
Attorney, Agent, or Firm—Dennison, Dennison, Townshend & Meserole

[57] ABSTRACT

An elbow shaped extension telescopically mountable on the bottom of a downspout and angled outwardly therefrom. The outwardly extending portion incorporates a perforated closure plate on the outer end and water discharging apertures peripherally thereabout. Alternatively, a pair of laterally directed valve controlled hose couplings are provided for the mounting of soaker hoses in water receiving communication with the distributor.

8 Claims, 6 Drawing Figures

WATER DISTRIBUTOR FOR DOWNSPOUTS

The present invention is generally concerned with rain water utilization and distribution, and more particularly relates to a downspout mountable distributor which receives the downspout directed rain water and provides for an effective distribution thereof in a manner which avoids the normally experienced damaging effect of such a water flow and in conjunction therewith provides for a beneficial utilization of the water.

More specifically, the device herein specifically controls the water flow so as to minimize the discharging water pressure and distribute the water in a manner which eliminates unsightly gouging of lawns, thereby protecting foundations, lawns, flower beds, and the like. In conjunction therewith, provision is specifically made so as to direct the water in a manner whereby positive benefits can be obtained therefrom, including the watering of plants, shrubs, and the like in a nondestructive manner.

Other advantages of the invention reside in its structurally simple and economical construction, the ease in which it can be installed by any homeowner, the weather resistant nature of the unit, and the fact that use of the water distributor eliminates the necessity for elaborate water disposal systems including underground piping and the like.

Also of significance is the fact that the water distributor is compact, attractive and, when installed, closely located against the building so as to not in any manner interfere with normal usage of the yard.

Basically, the water distributor, in achieving the above objects, is constructed in the manner of an elbow section which telescopically mounts on the bottom of a downspout and angles outwardly therefrom. The outer end of the distributor is closed, either permanently or by a removable panel, with the adjoining portion of the distributor provided with water passing apertures at peripherally spaced points thereabout. Such apertures can comprise multiple small outlets through which the water is directly sprayed or discharged, or a pair of larger openings within which a pair of valve controlled hose couplings are mounted. In the latter case, soaker hoses can be attached to the couplings and adjusted as desired for a distribution of the water.

These together with other objects, advantages and features of the invention which will become subsequently apparent reside in the details of construction and operation as more fully hereinafter described and claimed, reference being had to the accompanying drawings forming a part hereof, wherein like numerals refer to like parts throughout, and in which:

Figure 1:
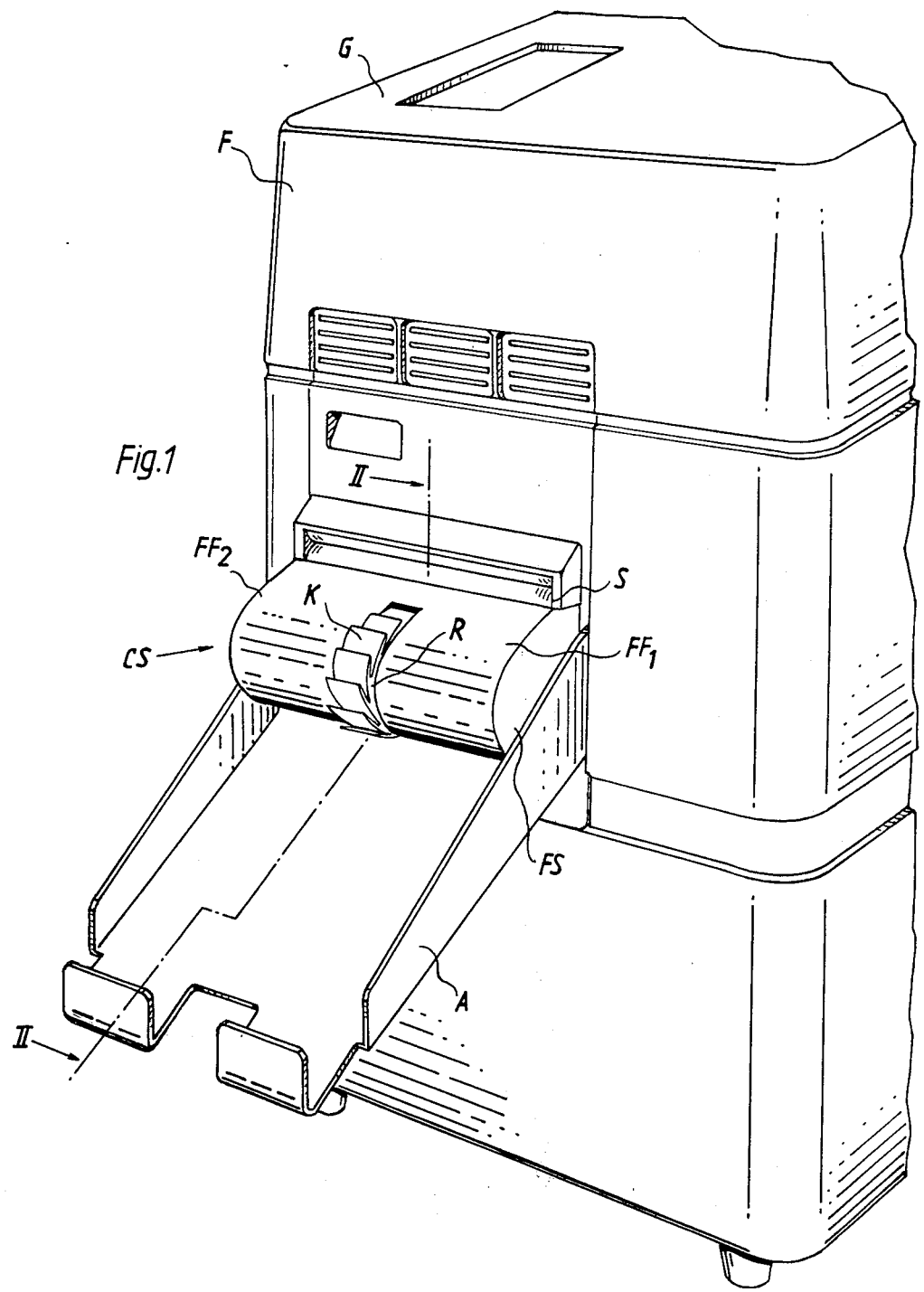
FIG. 1 is a perspective view of the water distributor installed in operative position on the lower end of a building mounted downspout.

Referring now more specifically to the drawings, reference numeral 10 is used to generally designate the basic water distributor of the invention. This distributor 10 is shaped generally in the manner of an elbow including an upper mounting section 12, a lower discharging section 14 and a central curved section 16 therebetween.

The distributor 10 is of course hollow and includes a cross section similar to that of the downspout 18 itself with at least the mounting section 12 being of a size so as to closely telescope over the lower end of the downspout 18 in the manner illustrated in FIG. 1.

As illustrated, the central curved section 16 will incorporate transverse corrugations so as to enable a maintenance of substantially the same internal cross section throughout the length of the distributor 10. In addition, both the mounting section and the discharge section are of approximately the same length with it being contemplated that the distributor 10 be supported solely by the downspout 18. Being of such a size, and so constructed, it will be appreciated that projection of the distributor out into the usable lawn area is maintained at a minimum.

It will be noted that the discharge section 14 angles outwardly from the downspout and mounting section 10 at approximately 45°. Such an outward angling of the discharge section 14 is essential, however, the specific angle thereof can vary. Incidentally, the distributor 10 is of rigid construction, preferably made of conventional rain guttering and downspout material such as galvanized iron, aluminum, or the like.

Figure 2:
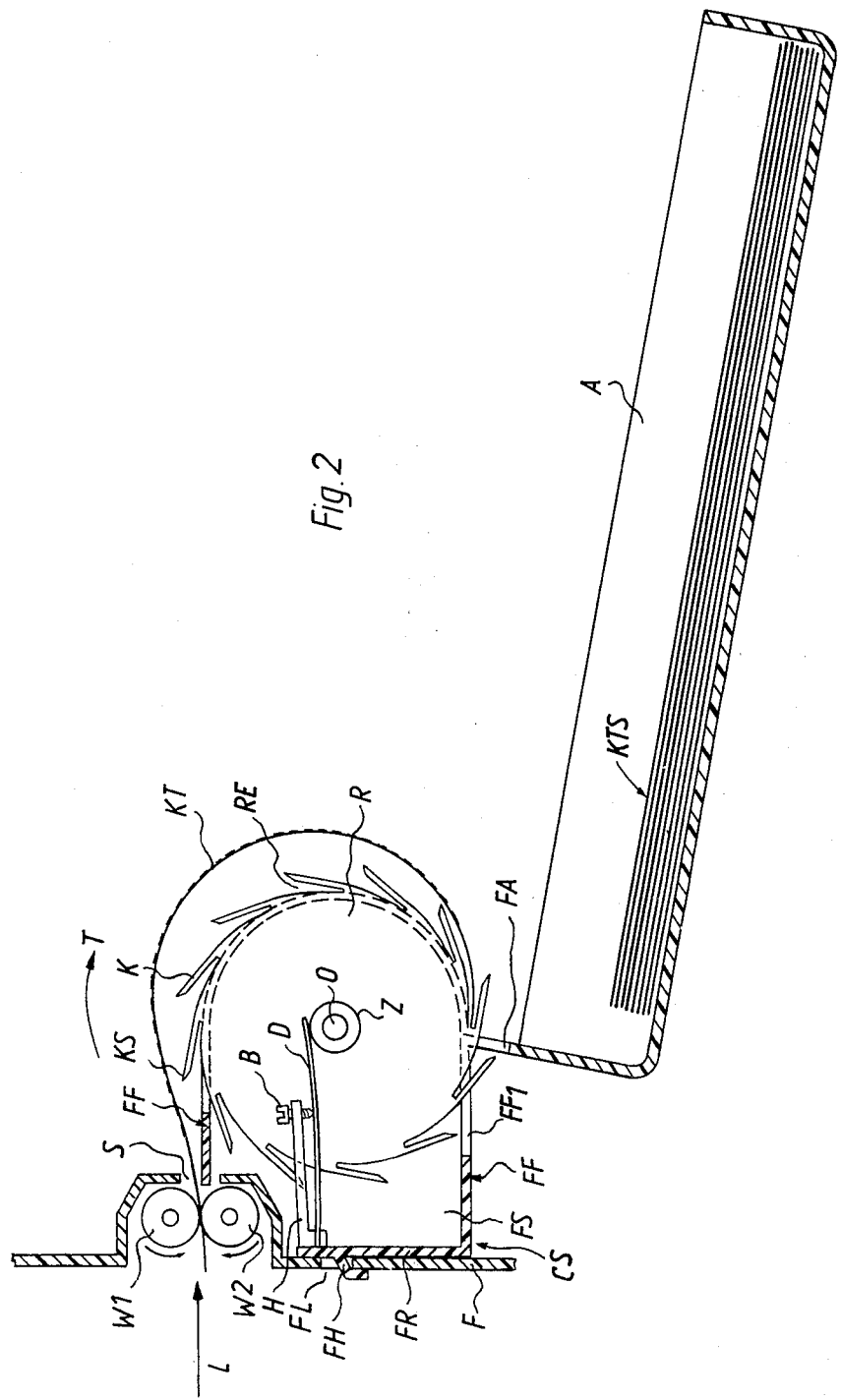
FIG. 2 is a perspective view of the distributor with the mounting screws exploded therefrom.

With reference to FIG. 2, in providing for a simple yet highly stable mounting of the distributor 10, the mounting section 12 is provided with a pair of opposed screw accommodating holes 20. A similar pair of holes are punched, drilled or otherwise formed in line with the holes 20 in the lower portion of the downspout 18. Such downspout holes will normally be formed after telescoping the mounting section 12 over the lower end of the downspout 18 with the holes being formed directly through the openings 20. Once the downspout holes are formed, a pair of self-tapping mounting screws 22 are threaded therein. This, in conjunction with a relatively snug telescopic engagement of the lower end of the downpout 18 in the distributor mounting section 12, results in a positive attachment of the distributor 10 to the downspout 18 for the reception of water therefrom. It will be appreciated that the depth of extension of the lower end of the downspout 18 to the mounting section 12 will be such so as to avoid any tendency for the distributor 10 to pivot about the screws 22.

The outer or discharge end of the discharge section 14 is provided with a flat rectangular frame 24 having integral reversely curled vertical edges 26.

A flat end plate or panel 28 is received over the front of the end frame 24 with the opposed vertical edges thereof locked within the reversely curled vertical edges 26, for example, by a crimped locking of these edges to the panel 28. This panel 28, aside from a few, for example, two, water discharging holes 30, completely closes the lower end of the distributor 10.

The discharge section 14 is in turn provided with a multiplicity of small water discharging holes or openings 32, preferably through each of the four sides thereof, along substantially the full length of the section from the front end frame 24 to the central curved section 16.

Constructed in this manner, it will be appreciated that, as illustrated in FIG. 1, water passing down the downspout 18 into the distributor 10 will discharge in a spray pattern through the various holes 30 and 32, the substantially closed nature of the lower end of the distributor insuring a slight backup of the water and discharge thereof through the sides of the discharge section 14. The size of the holes will normally be such so as to provide for an even non-damaging outward spraying of the water in a large pattern about the distributor. In this manner, not only will there be no eroding of the soil, but at the same time an even distribution of the water about the adjoining lawn area, shrubbery, and the like will be effected, thus beneficially utilizing this water.

Figure 4:
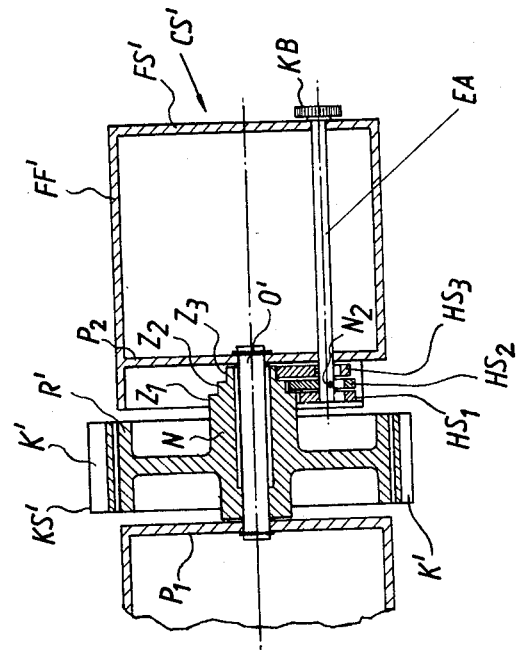
FIG. 4 is a perspective view of a slightly modified form of distributor wherein the end plate is removable.
Figure 3:
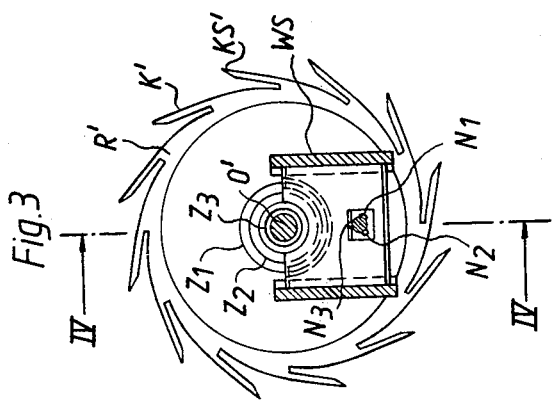
FIG. 3 is a cross sectional detail taken substantially on a plane passing along line 3—3 in FIG. 2.
Figure 1:
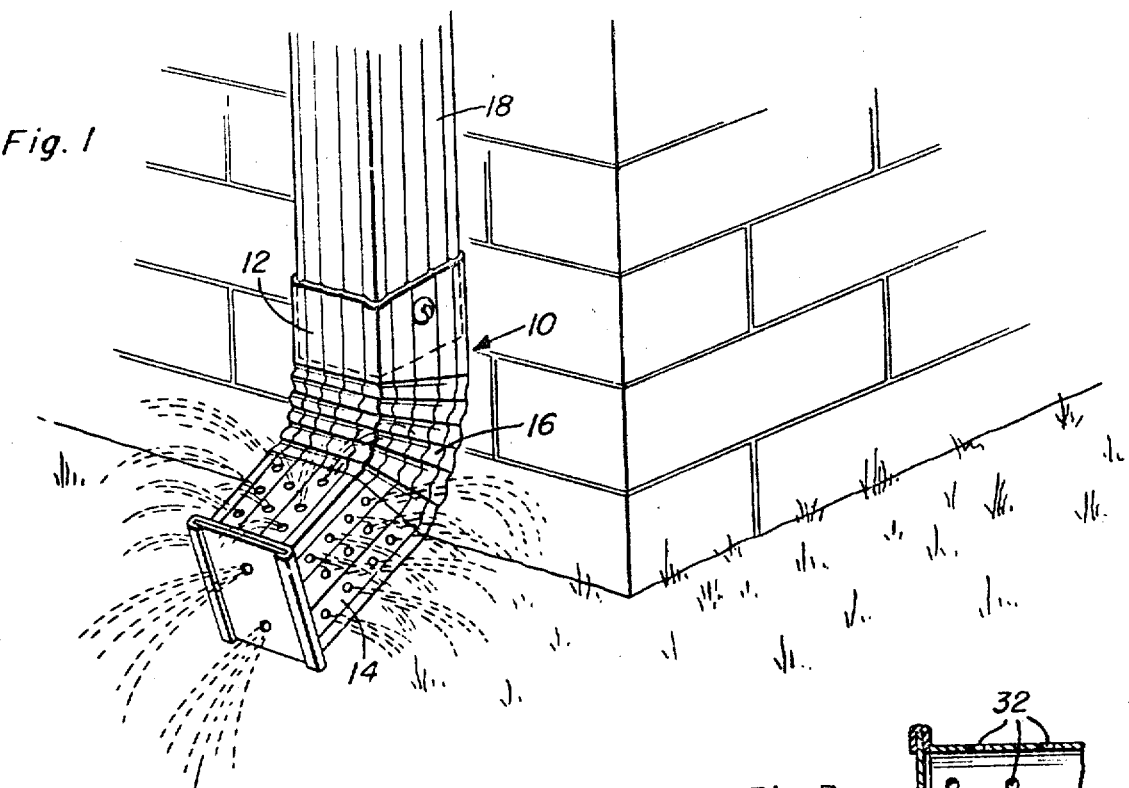
Figure 3:
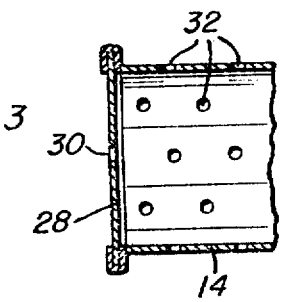
Figure 2:
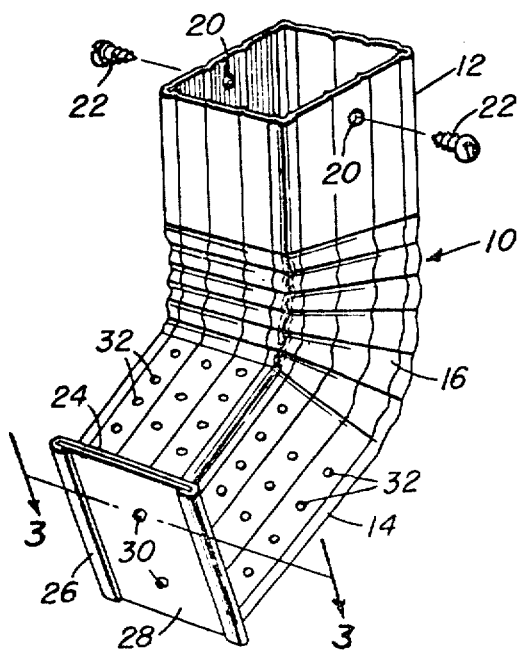
Figure 4:
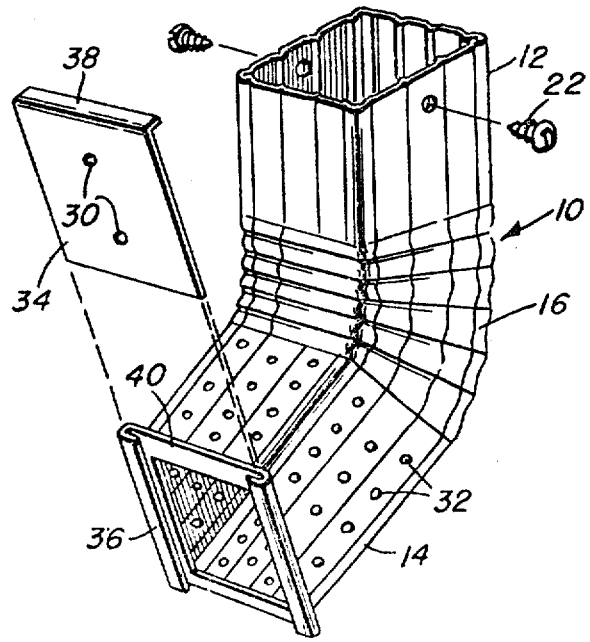

With reference to FIG. 4, the end panel, herein designated by reference numeral 34, can be removably mounted. In effecting this, the opposed front frame reversely curled edges or flanges 36 can define channels which slidably receive the opposed edges of the panel 34. The panel 34 in turn will include some means for fixing the mounted position thereof, such as an integral reversely bent upper flange 38 which, upon a positioning of the panel 34, rests on the upper edge of the flat end frame 40. By providing for a selectively removal of the front panel 34, a periodic cleaning of the interior of the distributor can be easily effected.

Figure 5:
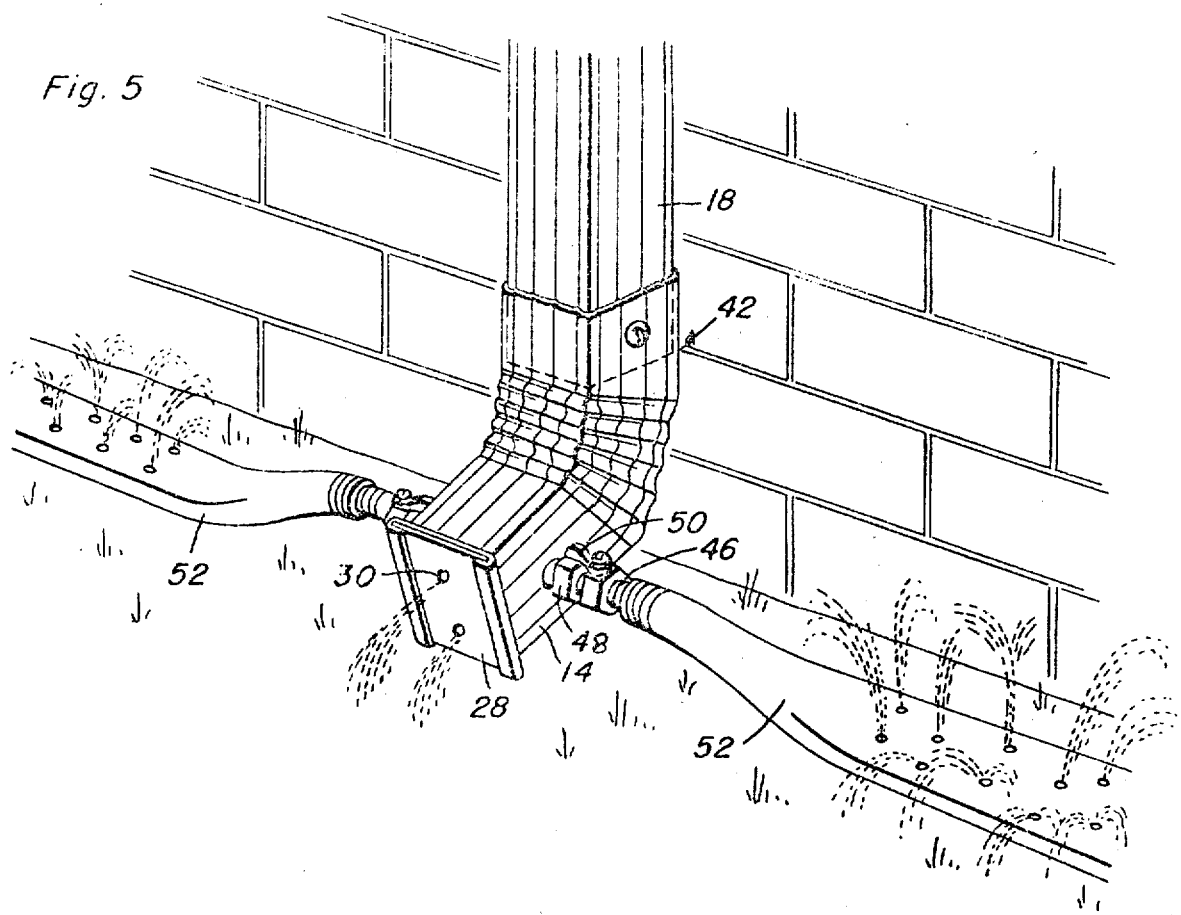
FIG. 5 is a perspective view of a further variation of the distributor wherein soaker hoses can be utilized.
Figure 6:
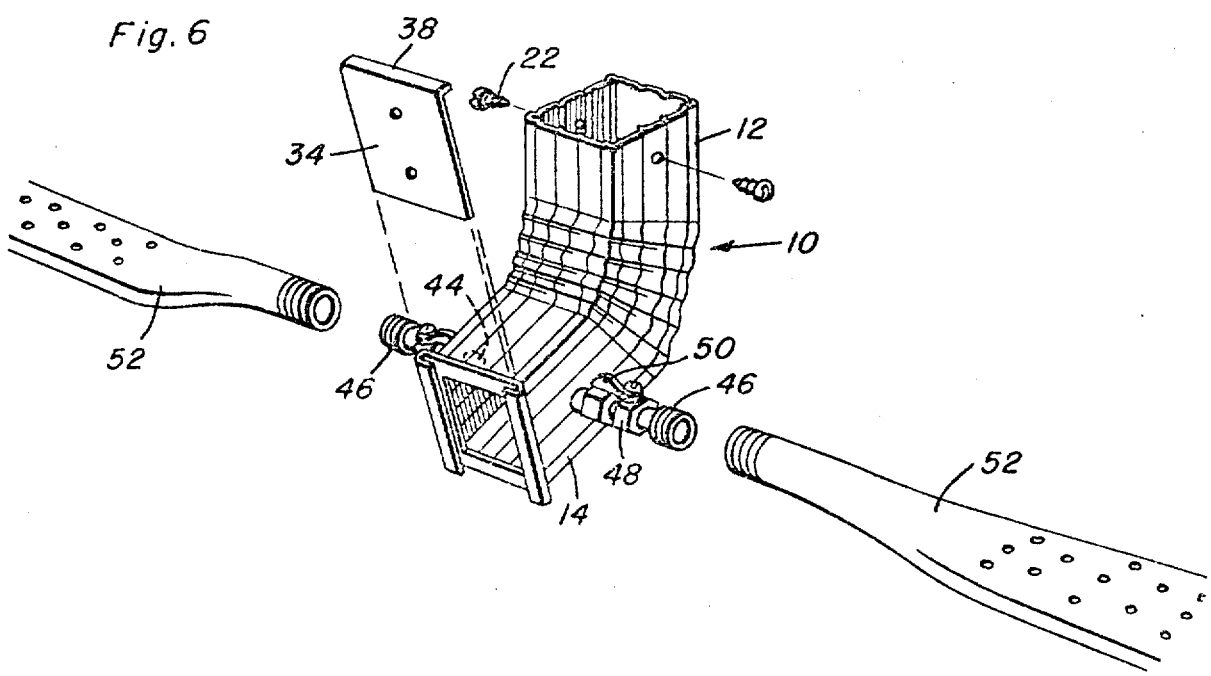
FIG. 6 is a perspective view of the distributor of FIG. 5 with the various detachable or removable components exploded therefrom for purposes of illustration.

With reference now to FIGS. 5 and 6, a variation of the water distributor has been illustrated therein and is generally designated by reference numeral 42. This distributor 42 differs from the distributor 10 only in the manner in which the water is discharged through the discharge section 14 rearward of the front panel 28 or 34, and as such, the same reference numerals utilized in describing similar features in FIGS. 1 through 4 have also been used in FIGS. 5 and 6.

In the distributor 42 the discharge holes or openings 32 have been replaced by a single pair of opposed enlarged openings in the vertical sides of the discharge section 14. One of these openings will be noted in phantom lines in FIG. 6 and has been designated by reference numeral 44. Mounted on each of the section sides in direct water receiving communication with the openings 44 is a pair of hose couplings 46 of any appropriate design incorporating a simple internal off-on valve unit 48 controlled by an external lever 50. The distributor 42 is completed by the threaded connection of an elongated soaker hose 52, of any appropriate construction, to each hose coupling 46. As will be appreciated, if deemed desirable under certain circumstances, only a single hose 52 need be used with the second hose coupling closed by means of the valve unit 48. By the same token, even when two soaker hoses are attached, the water can be selectively distributed therebetween by means of the off-on valve.

By providing for the discharge of the downspout water to elongated soaker hoses, it will be appreciated that there will be a substantially greater freedom in distributing the water as desired to plants, shrubs, and the like with the flexible nature of the hoses allowing placement thereof as desired. Further, the side discharge of the water into the hoses eliminates the necessity of extending the hoses perpendicularly outward from the building into the usable area of the lawn and into the way of lawn mowers and other lawn care equipment.

From the foregoing, it should be appreciated that a highly unique system has been devised for accommodating and safely disposing of the rain water from a downspout. This has been achieved in a manner which provides for a beneficial utilization of the water. The distributor itself is compact, easily mounted, and supported entirely on the downspout.

The foregoing is considered as illustrative only of the principles of the invention. Further, since numerous modifications and changes may occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A water distributor comprising a rigid hollow elbow shaped extension selectively mountable on the lower end of a downspout in water receiving communication therewith, said extension including opposed generally equal length linear end sections comprising a first downspout engaging mounting end section inward of a first end of the extension and a second water discharging end section inward of the second end of the extension and angularly related to the mounting section, means for restricting the axial discharge of water from the discharge end section through the second end of the extension comprising a panel closing the second end of the extension, said panel having a small number of water passing openings therein forming a combined flow path of substantially less area than the area of the second end, and means encouraging lateral discharge of water from the discharge end section inward of the second end, the means encouraging lateral discharge of water from the discharge end section comprising at least one lateral opening through said discharge end section and a hose coupling mounted on the extension in alignment with the opening, said hose coupling being adapted to selectively mount an elongated water distributing hose.

2. The distributor of claim 1 wherein said hose coupling includes an on-off valve assembly for a selective control of the discharge of water therethrough.

3. The distributor of claim 2 including means mounting said panel for selective removal and exposure of the interior of the extension.

4. The distributor of claim 1 including an elongated water distributing hose engaged with said hose coupling and extending laterally outward from said discharge end section.

5. The distributor of claim 2 including a second lateral opening through said discharge end section remote from said first mentioned lateral opening, a hose coupling mounted in alignment with the second opening and an on-off valve assembly included in the second hose coupling for a selective control of the discharge of water therethrough.

6. The distributor of claim 5 including an elongated water distributing hose mounted on each hose coupling and projecting laterally outward from the discharge end section.

7. For use in conjunction with a downspout mountable along a building wall, a water distributor, said distributor comprising a hollow elbow shaped extension, said extension including a first end telescopically engageable with the lower end of a downspout, and a second end angularly remote from said first end for orientation outward of the building wall, means closing said second end in a manner so as to restrict flow from the extension therethrough, water discharging openings laterally through said extension at spaced points thereabout inward of said second end, a hose coupling mounted on said extension about each discharge opening, each hose coupling projecting laterally from said extension, and a water distributing hose coupled to each coupling and projecting laterally from said extension for orientation generally parallel to the building wall.

8. The distributor of claim 7 wherein each hose coupling includes an on-off valve assembly for a selective control of the discharge of water therethrough.

* * * * *

UNITED STATES PATENT OFFICE
CERTIFICATE OF CORRECTION

Patent No. 3,904,121     Dated September 9, 1975

Inventor(s) Edward R. Geagan     Page 1 of 3

It is certified that error appears in the above-identified patent and that said Letters Patent are hereby corrected as shown below:

In the grant (only), the present sheets of drawing should be cancelled and the attached sheets substituted therefor, as part of the Letters Patent.

Signed and Sealed this sixteenth Day of March 1976

[SEAL]

Attest:

RUTH C. MASON
*Attesting Officer*

C. MARSHALL DANN
*Commissioner of Patents and Trademarks*